United States Patent
Broghammer et al.

(10) Patent No.: US 9,776,292 B2
(45) Date of Patent: Oct. 3, 2017

(54) METHOD FOR ASSEMBLING A HELICALLY GEARED FIRST SPROCKET AND A SECOND HELICALLY GEARED SPROCKET TO FORM A TRANSMISSION

(71) Applicant: IMS GEAR GMBH, Donaueschingen (DE)

(72) Inventors: Marcel Broghammer, Schramberg (DE); Martin Obergfoell, Donaueschingen (DE)

(73) Assignee: IMS Gear SE & Co. KGaA, Donaueschingen (DE)

(*) Notice: Subject to any disclaimer, the term of this patent is extended or adjusted under 35 U.S.C. 154(b) by 367 days.

(21) Appl. No.: 14/271,935

(22) Filed: May 7, 2014

(65) Prior Publication Data
US 2015/0020387 A1    Jan. 22, 2015
US 2017/0216978 A9    Aug. 3, 2017

(30) Foreign Application Priority Data
Jul. 19, 2013    (EP) .................................... 13177298

(51) Int. Cl.
| B23P 15/00 | (2006.01) |
| B23P 15/14 | (2006.01) |
| F16H 57/023 | (2012.01) |
| F16H 57/039 | (2012.01) |
| F16H 57/00 | (2012.01) |
| F16H 57/038 | (2012.01) |

(52) U.S. Cl.
CPC ............ *B23P 15/14* (2013.01); *F16H 57/023* (2013.01); *F16H 57/039* (2013.01); *F16H 57/038* (2013.01); *F16H 2057/0062* (2013.01); *Y10T 29/49464* (2015.01); *Y10T 29/53691* (2015.01)

(58) Field of Classification Search
CPC ...... B23P 15/14; F16H 57/039; F16H 57/023; F16H 57/038; F16H 2057/0062; Y10T 29/53691; Y10T 29/49464
See application file for complete search history.

(56) References Cited

U.S. PATENT DOCUMENTS 5,836,076 A * 11/1998 Duta ................ F16H 57/023
29/407.05

FOREIGN PATENT DOCUMENTS

| DE | 10029218 A1 | 6/2000 |
| DE | 102004054716 B3 | 4/2006 |
| EP | 076839 A1 | 10/1996 |
| JP | 09049552 | 2/1997 |

OTHER PUBLICATIONS

EPO Search Report dated Oct. 30, 2013.

* cited by examiner

Primary Examiner — Richard Chang
(74) Attorney, Agent, or Firm — Juneau & Mitchell

(57) ABSTRACT

A method for assembling a helically geared first sprocket, particularly a worm gear and a second sprocket arranged on an axis, particularly a worm, to form a transmission, particularly a worm drive, in which the first sprocket is positioned coaxially in reference to an axis of assembly of the first sprocket, aligned at a 90° position in reference to the axis via an assembly device.

3 Claims, 2 Drawing Sheets

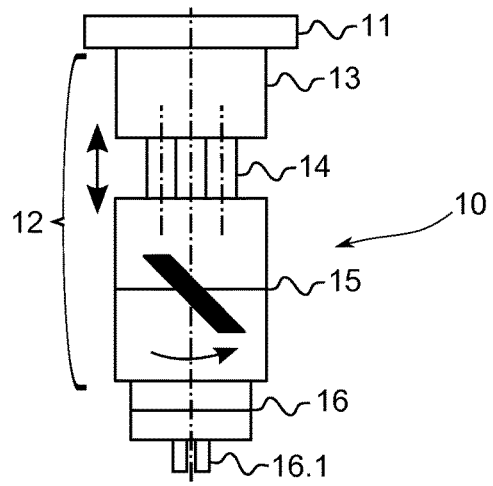
Fig. 1
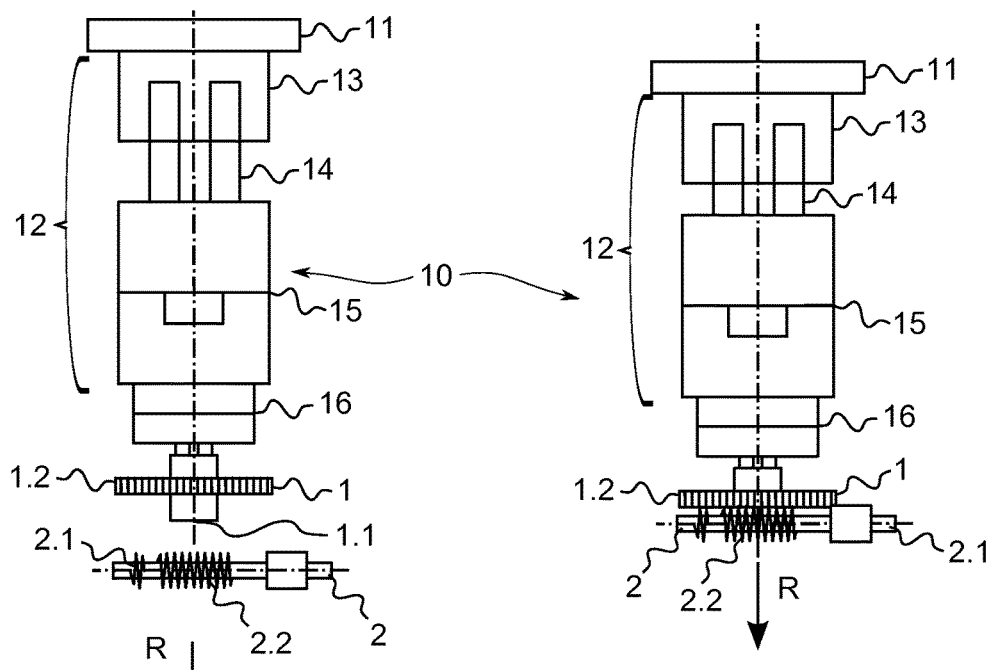
Fig. 2
Fig. 3A
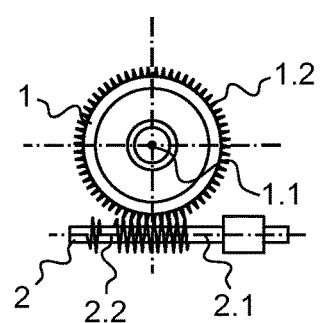
Fig. 3B

METHOD FOR ASSEMBLING A HELICALLY GEARED FIRST SPROCKET AND A SECOND HELICALLY GEARED SPROCKET TO FORM A TRANSMISSION

CROSS REFERENCE TO RELATED APPLICATIONS

This patent application claims priority European Patent Application 13 177 298.0-1752, filed on Jul. 19, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a method for assembling a helically geared first sprocket and a second helically geared sprocket to form a transmission. Further, the invention relates to an assembly device for executing the method according to the invention.

Background of the Invention

The current state of knowledge is as follows.

In order to assemble a helically geared worm gear and a worm to form a worm drive, it is known to use for this purpose a so-called assembly device with a pneumatic axis. For the assembly process, the worm gear is positioned by this assembly device such that the axis of assembly and the worm gear are aligned coaxially in reference to each other. The worm gear then axially approaches the worm until contacting it. An engagement with the worm is not possible when in this position of the worm gear, i.e. the teeth are not located such that engagement is possible, the worm gear is rotated until the teeth are rotated into the correct position of assembly via the rotation of adjusting lateral cylinders of the pneumatic axis, and thus the teeth of the worm gear and the worm can engage each other. In this process, however, canting of the worm gear is possible, potentially damaging the components involved. In particular when using a sintered worm gear instead of a worm gear produced from steel there is an increased risk of damage, because sharp edges develop at the bonding sections of the worm wheel due to the sintering process.

Based on this prior art, the objective of the invention is to provide a method of the type stated at the outset in which the above-mentioned disadvantages are avoided, particularly any canting of the worm gear to be assembled being prevented. Further, the objective of the invention includes providing an assembly device for executing the method according to the invention. In doing so, the invention shall not be limited to the assembly of the worm gear and a worm. Rather, the assembly shall also be suitable for a pair of helically geared sprockets and particularly helically geared spur gears.

BRIEF SUMMARY OF THE INVENTION

In a preferred embodiment, a method for assembling a helically geared first sprocket, and a second sprocket, arranged on an axis, in order to form a transmission, in which via an assembly device the first sprocket is positioned coaxially in reference to an axis of assembly of the first sprocket, positioned at a 90° position in reference to the axis, wherein a) the first sprocket is moved in the axial direction of assembly via the assembly device until contacting the second sprocket, b) in case of missing gears between the first sprocket and the second sprocket the first sprocket is lifted off the second sprocket via the assembly device, opposite the direction of assembly, and the first sprocket is rotated by a predetermined rotary angle around its own axis, c) the processing steps a) and b) are repeated as many times as necessary until the first sprocket can be brought into engagement with the second sprocket, and d) the first sprocket can be completely engaged with the second sprocket via the assembly device by way of executing an axial compensation motion in the direction of assembly and by a compensating rotary motion caused by the helical teeth of the first sprocket.

In another preferred embodiment, the method as described herein, wherein the helically geared first sprocket is a worm gear, the second sprocket is a worm and the transmission is a worm drive.

In another preferred embodiment, the method as described herein, wherein the predetermined rotary angle according to the processing step b) is smaller than the degree allocated to the arc of the division of the first sprocket.

In another preferred embodiment, an assembly device for assembling a helically geared worm gear and a worm arranged on a worm axis in order to form a worm drive, with the worm gear being positioned coaxially in reference to an axis of assembly of the worm gear, aligned at a 90° position in reference to the worm axis, via an assembly device, particularly to execute the method according to claim 2, wherein the assembly device comprises a motion unit and a compensation unit, the compensation unit is connected in a torque-proof fashion to the motion unit, the motion unit is embodied to axially and rotationally move the worm gear, and the compensation unit is embodied to move the worm gear independent from the motion unit with a compensating rotary motion and a compensating axial motion.

In another preferred embodiment, the assembly device as described herein, wherein in a position of the worm gear, at which it can engage the teeth of the worm, particularly a position reached via the processing step c), the compensation unit is embodied to execute the compensating rotary motion and the compensating axial motion for a complete engagement of the worm gear with the worm.

In another preferred embodiment, the assembly device as described herein, wherein the compensation unit comprises a grasping module with grasping digits for receiving the worm gear.

In another preferred embodiment, the assembly device as described herein, wherein the compensation unit comprises a bolted flange for a torque-proof connection to the motion unit.

In another preferred embodiment, the assembly device as described herein, wherein the worm gear is placed by a first helically geared sprocket, particularly a first helically geared spur gear, and the worm by a second helically geared sprocket, particularly a second helically geared spur gear.

BRIEF DESCRIPTION OF THE DRAWINGS

FIG. 1 is a schematic drawing evidencing a cross-section of an assembly device for executing the method according to the invention.

FIG. 2 is a schematic drawing evidencing a processing step to assemble a worm gear with a worm using the assembly device according to FIG. 1.

Each of FIG. 3A and FIG. 3B is a schematic drawing evidencing another processing step subsequent to the processing step according to FIG. 2.

Each of FIG. 5A

DETAILED DESCRIPTION OF THE INVENTION

Figure 4:
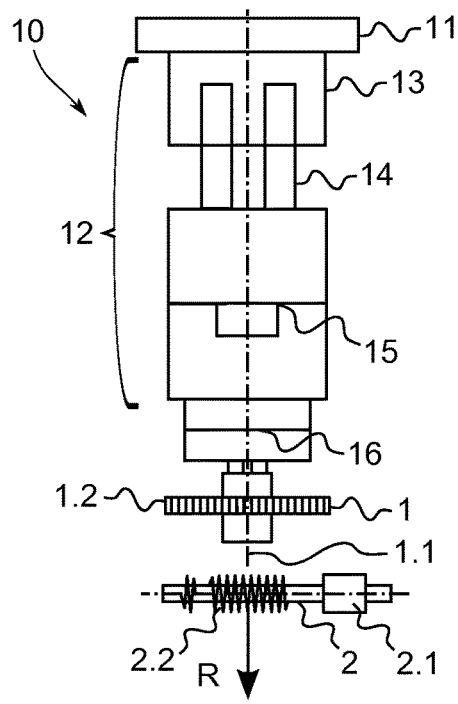
FIG. 4 is a schematic drawing evidencing another processing step subsequent to the processing step according to FIG. 3.

According to the invention, avoiding the canting of a worm gear is accomplished by a method for assembling a first helically geared sprocket, particularly a worm gear, and a second helically geared sprocket, arranged on an axis of this first sprocket, particularly a worm, to form a transmission, particularly a worm drive, in which the first sprocket is positioned coaxially in reference to a position of an axis of assembly, off-set by 90° in reference to the axis of the first sprocket via an assembly device, is characterized according to the invention such that
   a) the assembly device moves the first sprocket in the axial direction of assembly until it contacts the second sprocket,
   b) in case of a missing gearing between the first sprocket and the second sprocket, the second sprocket is lifted via the assembly device opposite the direction of assembly off the second sprocket and the first sprocket is rotated by a predetermined angle of rotation about its axis,
   c) the processing steps a) and b) are repeated until the first sprocket can be made to engage the second sprocket, and
   d) via the assembly device, the first sprocket completely engages the second sprocket via executing an axial motion in the direction of assembly and a compensating rotary motion by the helical gearing of the first sprocket.

Canting of the worm gear to be assembled is securely prevented by the worm gear reversing in the axial direction of assembly in case of a mismatched position for engagement of the gears of the worm gear to be made to engage and the worm and the subsequent twisting of the worm gear by a predetermined rotary angle (processing step b). The worm gear is completely assembled with the worm only when the worm gear shows a position in which the gears of the worm gear and the worm allow engagement, thus the worm gear is made to engage the gears of the worm.

According to an advantageous embodiment of the invention, the predetermined rotary angle according to the processing step b) is smaller than the degree according to the arc of the division of the worm gear. This way it is ensured that after a repetition of the processing step b) the relative position of the teeth of the gears of the worm gear and the gears of the worm has The method disclosed herein above may further be accomplished with an assembly device for assembling a helically geared worm gear and a worm arranged on a worm axis to form a worm drive, with the worm gear being positioned via a positioning device coaxially in reference to an axis of assembly of the worm gear, positioned at an angle of 90° in reference to the worm axis, is characterized according to the invention such that
   the assembly device comprises a compensation unit and a motion unit,
   the compensation unit is connected in a torque-proof fashion to the motion unit,
   the motion unit is embodied to move the worm gear axially and rotationally, and
   the compensation unit is embodied to move the worm gear independently from the motion unit with a compensating rotary motion and an axial compensation motion.

With this assembly device according to the invention, different processes of the assembly of the worm gear with the worm are executed by various components of the assembly device. Here, the processing steps a) and b), which relate to the axial displacement of the worm gear in the direction of assembly as well as perhaps its distortion about the predetermined angle of rotation, are executed by the motion unit, while the axial and rotary motion is initiated by the compensation unit for the complete assembly during the correct position of the teeth of the worm gear of the worm.

In an advantageous fashion, it is therefore provided in a further development that at a position of the worm gear in which the worm can be engaged by the gears, particularly a position achieved by the processing step c), the compensation unit is embodied to execute the rotary compensation motion and the axial compensation motion in order to ensure a complete engagement of the teeth of the worm gear with the worm.

Further, according to another advantageous embodiment, the compensation unit comprises a grasping module with grasping digits for receiving the worm gear.

Finally, according to a further development the compensation unit comprises a bolted flange for a torque-proof connection to the motion unit.

DETAILED DESCRIPTION OF THE FIGURES

Although in the following exemplary embodiment it is repeatedly discussed that a worm and a worm gear shall be assembled to each other, the present invention shall not be limited to this. Rather, helically geared sprockets, particularly spur gears with helical gears, can be assembled to each other, as described in the following for a worm and a worm gear.

The process of assembling a worm gear 1 and a worm 2 to form a worm drive 3 via an assembly device 10 is described and explained based on FIGS. 2 to 6. Accordingly, first the assembly device 10 is described which is shown in FIG. 1.

This assembly device 10 comprises a motion unit 11 and a compensation unit 12 connected to it. This compensation unit 12 is coupled in a torque-proof fashion with one end via a bolted flange 13 to the motion unit 11 and at the opposite end comprises grasping digits 16.1 for receiving the worm gear 1.

The motion unit 11 serves to move the compensation unit 12, receiving the worm gear 1, both in the axial direction, i.e. in the axial direction of assembly R in reference to the worm drive 3 to be assembled (cf. FIG. 3), as well as independently of the motion to execute a rotary motion in the axial direction in reference to this axial direction of assembly R.

The compensation unit 12 comprises, in addition to the bolted flange 13, a component 14 for an axial compensation as well as a component 15 for a rotary compensation. For this purpose, the component 14 comprises elastic parts which allow a flexible axial stroke. The components 15 for a rotary compensation are also realized via elastic parts, so that a rotary compensation is possible independent of the axial compensation via the component 14.

Finally, this compensation unit 12 also allows a grasping module 16, which receives the worm gear 1 to be assembled via the above-mentioned grasping digits 16.1. The assembly process for assembling a worm gear 1 and a corresponding worm 2 to form a worm drive 3 begins with the motion unit 11 of the assembly device 10 positioning the compensation unit 12, which has accepted the worm gear 1, according to FIG. 2, such that the worm gear 1 and its axis of assembly 1.1 are aligned coaxially in reference to each other.

In a first processing step (processing step a) the compensation unit 12 is moved via the motion unit 11 in the axial direction of assembly R until the worm gear 1 contacts the worm 2. This situation is shown in FIG. 3a) in a side view, illustrating the arrangement comprising the worm gear 1 and the worm 2, as well as in FIG. 3b) in a top view. In particular, it is discernible from this FIG. 3b) that the teeth of the gears 1.2 and 2.2 of the worm gear 1 and/or the worm 2 are not facing recesses but face each other directly so that any engagement of the teeth of the worm gear 1 with the worm 2 is impossible from this position of the worm gear 1.

When an engagement of teeth is impossible, the axial compensation prevents any damage of the worm gear and/or the worm.

The activation of the axial compensation is detected via a sensor.

In a second subsequent processing step (processing step b) the compensation unit 12 is lifted via the motion unit 11 off the worm 2 opposite the direction of assembly R and subsequently the worm gear 1 is rotated by a predetermined rotary angle about the axis of the worm gear (cf. FIG. 4). This rotary angle amounts to only a few degrees and is smaller than degree equivalent to the arc of the division of the worm gear 1. This way it is ensured that this rotary angle is smaller than the division p of the gears 1.2 of the worm gear 1, and thus it is ensured that after this rotation of the worm gear 1 a changed relative position is given between the teeth of the gears 1.2 and 2.2 of the worm gear 1 and/or the worm 2.

Figure 5A:
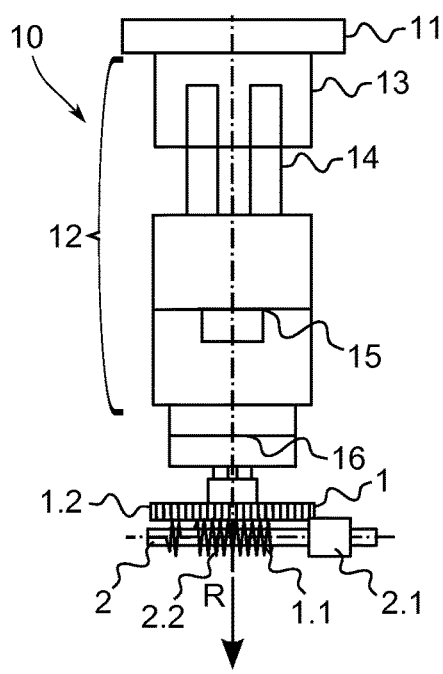
FIG. 5B is a schematic drawing evidencing another processing step subsequent to the processing step according to FIG. 4.
Figure 5B:
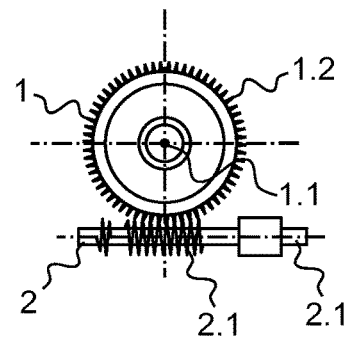

Now, the first processing step (processing step a) according to FIG. 2 is repeated, thus the compensation unit 12 is approached via the motion unit 11, again in the axial direction of assembly R towards the worm 2, until the worm gear 1 once more contacts the worm 2, as shown in FIG. 5. FIG. 5a) shows a side view of the assembly device 10 and the worm 2, while FIG. 5b) shows a top view of said arrangement. In particular, it is discernible from this top view according to FIG. 5b) that the teeth of the gears 1.2 and 2.2 of the worm gear 1 and/or the worm 2 are now located over the tooth gaps, i.e. the worm gear 1 can now engage the worm 2.

However, if the teeth of the gears 1.2 and 2.2 of the worm gear 1 and/or the worm 2 are still not located over tooth gaps after this repeated first processing step, the second processing step (processing step b) is executed once more; thus, the compensation unit 12 is moved back via the motion unit 11, a predetermined rotary motion of the worm gear 1 is executed once more, and the first processing step is executed once more.

The first and second processing step are repeated as many times as necessary (processing step c) until the teeth of the gears 1.2 and 2.2 of the worm gear 1 and/or the worm 2 are located on gaps.

If this condition has been reached with regards to the placement of the teeth of the worm gear 1 and the worm 2, in the last processing step (processing step d) the complete assembly of the worm gear 1 and the worm 2 is executed. For this purpose, according to FIG. 6, the gears 1.2 of the worm gear 1 are made to completely engage the gears 2.2 of the worm 2 by a rotary compensation motion being performed by the worm gear 1 around the axis of assembly 1.1 of the worm gear 1. For this purpose, the component 15 of the compensation unit 12 is activated for a rotary compensation. These components 14 and 15 allow the axial compensation motion and the rotary compensation motion of the worm gear 1, which is necessary for the complete engagement of the teeth due to the helical tooth geometry of both of the worm gear 1 as well as the worm 2.

Figure 6:
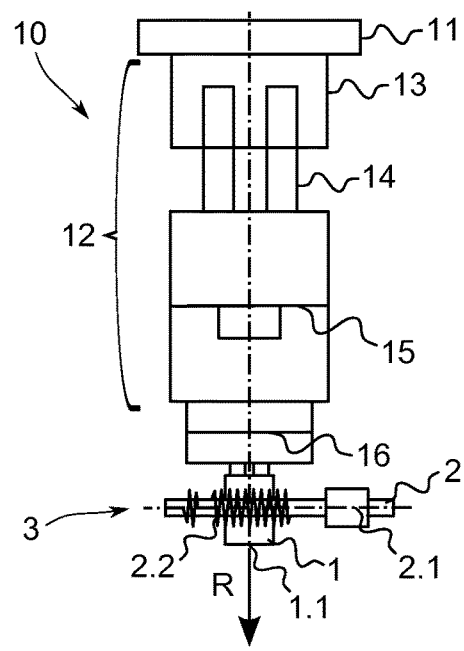
FIG. 6 is a schematic drawing evidencing the last processing step, leading to the complete assembly of the worm gear with the worm.

According to FIG. 6 the worm gear 1 and the worm 2 are positioned in reference to each other such that they form the worm drive 3 to be formed.

Based on the elastic parts of the components 14 and 15 of the compensation unit 12, which allow the compensation motions, the worm gear 1 and the worm 2 can be assembled floating, i.e. they allow only a motion in the respective desired direction. The worm gear 1 is flexible in the axial direction of assembly R around the axis of assembly 1.1, and during the assembly process it is aligned coaxially in reference to the position of assembly.

LIST OF REFERENCE NUMBERS

1 First helically geared sprocket, particularly [a] worm gear
  1.1 Axis of assembly of the worm gear 1
2 Second helically geared sprocket, particularly [a] worm
  2.1 Axis of the worm 2
3 Gear drive, particularly [a] worm drive
10 Direction of assembly
11 Motion unit of the assembly device 10
12 Compensation unit of the assembly device 10
13 Bolted flange of the compensation unit 12
14 Component of the compensation unit 12 for an axial compensation
15 Component of the compensation unit 12 for a rotary compensation
16 Grasping module
  16.1 Grasping digit The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

We claim:

1. A method for assembling a helically geared first sprocket (1), and a second sprocket (2), arranged on an a first axis (2.1), in order to form a transmission, in which, via an assembly device (10), the first sprocket (1) is positioned coaxially in reference to an a second axis (1.1), positioned at a 90° position in reference to the first axis (2.1), wherein a) the first sprocket is moved in thean axial direction of assembly (R) via the assembly device (10) until contacting the second sprocket (2), b) in case of missing gears between the first sprocket (1) and the second sprocket (2) the first sprocket (1) is lifted off the second sprocket via the assembly device (10), opposite the direction of assembly (R), and the first sprocket (1) is rotated by a predetermined rotary angle around its own axis, c) the processing steps a) and b) are repeated as many times as necessary until the first sprocket (1) can be brought into engagement with the second sprocket (2), and d) the first sprocket (1) can be completely engaged with the second sprocket (2) via the assembly device (10) by way of executing an axial compensation motion in the direction of assembly (R) and by a compensating rotary motion caused by the helical teeth of the first sprocket (1).

2. The method of claim 1, wherein the helically geared first sprocket (1) is a worm gear, the second sprocket (2) is a worm and the transmission is a worm drive.

3. The method according to claim 2, wherein the predetermined rotary angle according to the processing step b) is smaller than the degree allocated to the arc of the division of the first sprocket (1).

\* \* \* \* \*